United States Patent
Gray et al.

(10) Patent No.: US 10,354,069 B2
(45) Date of Patent: Jul. 16, 2019

(54) AUTOMATED REVERSE ENGINEERING

(71) Applicant: BAE SYSTEMS Information and Electronic Systems Integration Inc., Nashua, NH (US)

(72) Inventors: Robert S Gray, Great Falls, VA (US); Vu T Le, Chantilly, VA (US); Robert B Ross, Fairfax, VA (US); Gregory S Sadosuk, Fairfax, VA (US); Michael J Weber, Warrenton, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 265 days.

(21) Appl. No.: 15/255,452

(22) Filed: Sep. 2, 2016

(65) Prior Publication Data
US 2018/0068121 A1 Mar. 8, 2018

(51) Int. Cl.
*G06F 21/56* (2013.01)
*G06F 8/53* (2018.01)
*G06F 11/36* (2006.01)
*G06F 8/74* (2018.01)

(52) U.S. Cl.
CPC .............. *G06F 21/563* (2013.01); *G06F 8/53* (2013.01); *G06F 8/74* (2013.01); *G06F 11/3636* (2013.01); *G06F 2221/033* (2013.01)

(58) Field of Classification Search
CPC ............................ G06F 21/125; G06F 21/563
USPC .................................. 713/150–155; 726/2–7
See application file for complete search history.

(56) References Cited

U.S. PATENT DOCUMENTS

| | | | | |
|---|---|---|---|---|
| 7,249,349 B2* | 7/2007 | Hundt | ..................... | G06F 8/656 717/130 |
| 7,360,207 B2* | 4/2008 | Fahs | ................... | G06F 11/3466 714/E11.2 |
| 7,661,095 B2* | 2/2010 | George | ............... | G06F 11/3466 717/130 |
| 7,752,609 B2* | 7/2010 | Rioux | ..................... | G06F 8/427 717/141 |
| 8,954,925 B2* | 2/2015 | Dutta | ........................ | G06F 8/74 717/105 |
| 9,213,838 B2* | 12/2015 | Lu | ......................... | G06F 21/563 |

(Continued)

OTHER PUBLICATIONS

Vu Le, ARE Automated Reverse Engineering, Apr. 2014, BAE Publication, pp. 1-4.*

(Continued)

*Primary Examiner* — Lynn D Feild
*Assistant Examiner* — Viral S Lakhia
(74) *Attorney, Agent, or Firm* — Maine Cernota & Rardin

(57) ABSTRACT

A Taint Modeling Function (TMF) finds abstract patterns and uses them to automate the malware detection process. TMF involves the process of statically analyzing a sequence of assembly language instructions and abstracting complex relationships among instruction inputs and outputs into a mathematical function containing a set of algebraic expressions. The set of expressions support fully automating semantic pattern detection in binary code. It deterministically generates outputs given inputs determining code block outputs, for given inputs, without executing the code. It detects code patterns automatically to spot bad coding patterns directly from the binary used to detect bugs statically in the entire application space.

19 Claims, 21 Drawing Sheets

HIGH LEVEL EMBODIMENT VIEW

(56) References Cited

U.S. PATENT DOCUMENTS

| | | | | |
|---|---|---|---|---|
| 9,531,745 | B1* | 12/2016 | Sharma | H04L 63/1433 |
| 2009/0183261 | A1 | 7/2009 | Peinado et al. | |
| 2009/0254891 | A1* | 10/2009 | Cui | G06F 8/53 |
| | | | | 717/138 |
| 2010/0251378 | A1* | 9/2010 | Eker | G06F 21/14 |
| | | | | 726/26 |
| 2010/0275188 | A1 | 10/2010 | Dubinsky et al. | |
| 2013/0117855 | A1* | 5/2013 | Kim | G06F 21/563 |
| | | | | 726/24 |
| 2014/0089202 | A1* | 3/2014 | Bond | H04L 9/0822 |
| | | | | 713/166 |
| 2014/0245271 | A1* | 8/2014 | Miller | G06F 8/423 |
| | | | | 717/146 |
| 2015/0121534 | A1* | 4/2015 | Zhao | G06F 21/6209 |
| | | | | 726/26 |
| 2015/0309813 | A1* | 10/2015 | Patel | G06F 8/75 |
| | | | | 703/22 |
| 2016/0072833 | A1* | 3/2016 | Kim | H04L 63/1425 |
| | | | | 726/23 |
| 2016/0156646 | A1 | 6/2016 | Hsueh et al. | |
| 2016/0180096 | A1* | 6/2016 | Sharma | G06F 21/577 |
| | | | | 726/25 |
| 2016/0217287 | A1* | 7/2016 | Davidson | G06F 21/14 |
| 2016/0328742 | A1* | 11/2016 | Shiravi Khozani | |
| | | | | G06Q 30/0248 |
| 2016/0364707 | A1* | 12/2016 | Varma | G06F 8/61 |
| 2017/0090929 | A1* | 3/2017 | Muttik | G06F 11/30 |

OTHER PUBLICATIONS

Liu, K, Tan H. and Chen, X., Binary Code Analysis. IEEE Computer Society, Computer, vol. 46, Issue 8, p. 60-68, 2013.
Christodorescu, M., and Jha, S., Static Analysis of Executables to Detect Malicious Patterns. In Proceedings of the 12th USENIX Security Symposium, Aug. 2003.
Karampatziakis, N., Static Analysis of Binary Executables Using Structural SVMs. In Proceedings of Neural Information Processing Systems, 2010.
Hanov, S., Static Analysis of Binary Executables, http://stevehanov.ca/cs842_project.pdf. URL checked Jan. 6, 2014.
Balakrishnan, G., Gruian, R., Reps, T. And Teitelbaum. T., CODESURFER/x86, A Platform for Analyzing x86 Executables. In Proceedings of the International Conference on Compiler Construction, Apr. 2005.
Microsoft. Phoenix Framework. http://research.microsoft.com/en-us/collaboration/focus/cs/phoenix.aspx. URL checked Jan. 6, 2014.
Brumley, D., Jager, I., Avgerinos, T., and Schwartz, E, Bap: A Binary Analysis Platform, in Proceedings of the 23rd International Conference on Computer Aided Verification, pp. 463-469, Springer, 2011.
Lim, J. and Reps, T., TSL: A System for Generating Abstract Interpreters and Its Application to Machine-Code Analysis. ACM Transactions on Programming Languages and Systems, 35(1), Apr. 2013.
Zynamics. BinNavi http://www.zynamics.com/binnavi.html. URL checked Jan. 6, 2014.
Dullien, T. and Porst, S., Reil: A Platform-independent Intermediate Representation of Disassembled Code for Static Code Analysis. CanSecWest, 2009.
zynamics (Google). BinNavi 4.0 Manual—REIL Specification. BinNavi 4.0 manual. http://www.zynamics.com/binnavi/manual/html/reil_language.htm URL checked Jan. 6, 2014.
Ross, R., and Sadosuk, G., PREIL: A Simple Language for Advanced Program Analysis. Technical Report, BAE Systems, 2012.
Porst, S., The REIL language—Part II. http://blog.zynamics.com/2010/06/22/the-reil-language-part-ii, URL checked Jan. 6, 2014.
Allen, F.E., Control Flow Analysis. In Proceedings of a symposium on Compiler optimization, p. 1-19, 1970.
Cocke, J., Global Common Subexpression Elimination, in Proceedings of a symposium on Compiler optimization, p. 20-24, 1970.
Cooper, K D., Harvey, T. J., and Kennedy, K. 2001. A simple, fast dominance algorithm. http://www.hipersoft.rice.edu/grads/publications/dom14.pdf. URL checked on Jan. 6, 2014.
Recursion. http://en.wikipedia.org/wiki/Recursion. URL checked on Jan. 16, 2014.
Gulwani, S., Srivastava, S., and Venkatesan, R., Program Analysis as Constraint Solving, in Proceedings of the 2008 ACM SIGPLAN conference on Programming Language design and implementation, Tucson, AZ, 2008.
Edward J. Schwartz, Thanassis Avgerinos, David Brumley, All You Ever Wanted to Know About Dynamic Taint Analysis and Forward Symbolic Execution (but might have been afraid to ask), 2010 IEEE Symposium on Security and Privacy, DOI 10.1109/SP.2010.26, pp. 317-331.
Godefroid, P., Levin, M.Y., Molnar, D., Automated Whitebox Fuzz Testing. In Proceedings of Network and Distributed Systems Security, p. 151-166, 2008.
Lee et al., ARE: Automated Reverse Engineering of Machine Code, Apr. 10, 2014, Retrieved from https://www.baesystems.com/en/download.
International Search Report, PCT/US17/49839, dated May 1, 2018. 8 pages.

\* cited by examiner

HIGH LEVEL EMBODIMENT VIEW

ANALYSIS TRANSFORMATION EMBODIMENT

300

| PREIL Instruction | Meaning (C Interpretation) |
|---|---|
| add[r32 4][i32 r1][r64 t1] | Addition: t1 = 4 + r1 |
| and[r32 t1][i32 F][r32 t2] | Bitwise AND: t2 = t1 & 0xF |
| bisz[r32 t1][][r8 t2] | Boolean is-zero: t2 = t1 ? 0 : 1 |
| div[r32 t1][r32 t2][r32 t3] | Unsigned division: t3 = t1 / t2 |
| ifm(r8 r1)[r8 t1][i8 9][r32 t2] | Conditional store to memory: *t2 = r1 ? t1 : 9 |
| ifr(r1 t1)[r8 r1][r8 r2][r8 r3] | Conditional store to register: r3 = t1 ? r1 : r2 |
| jcc[r32 t0][][r32 t1] | Jump conditional: if (t0) goto t1 |
| ldm[r32 t1][][r8 t2] | Load from memory: t2 = *t1 |
| lsh[r32 t1][i16 4][r64 t2] | Left shift: t2 = t1 << 4 |
| mod[r32 t0][r32 t1][r32 t2] | Modulo: t2 = t0 % t1 |
| mul[r32 t1][r32 t2][r64 t3] | Unsigned multiply: t3 = t1 * t2 |
| nop[][][] | No operation: ; |
| or[r32 t1][i32 4][r32 t2] | Bitwise OR: t2 = t1 | 4 |
| rsh[r32 t1][i32 5][r64 t2] | Logical right shift: t2 = t1 >> 5 |
| stm[r8 t1][][r32 t2] | Store to memory: *t2 = t1 |
| str[r32 t1][][r32 t2] | Store to register: t2 = t1 |
| sub[r32 t1][i32 4][r64 t2] | Subtract: t2 = t1 - 4 |
| undef[][][r32 r1] | Undefine a register: int u; r1 = u |
| unkn[][][] | Unknown operation: void f (); f () |
| xor[r32 t1][i32 4][r32 t2] | Bitwise XOR: t2 = t1 ^ 4 |

TABLE 1: EXAMPLE PREIL INSTRUCTIONS

| x86 Instruction | Corresponding PREIL List |
|---|---|
| push eax | sub[r32 esp][i32 4][r32 esp]<br>stm[r32 eax][ ][r32 esp] |

TABLE 2: PREIL TRANSLATION OF x86 "push eax"

| PREIL Operation | Transformation Operation |
|---|---|
| add[r32 4][i32 r1][r64 t1] | t1 = r1 + 4 |
| and[r32 t1][i32 F][r32 t2] | t2 = 0xf & t1 |
| bisz[r32 t1][][r8 t2] | t2 = t1 ? 0:1 |
| div[r32 t1][r32 t2][r32 t3] | t3 = t1 / t2 |
| ifm(r8 r1)[r8 t1][i8 9][r32 t2] | [t2] = r1? t1:9 |
| ifr(r1 t1)[r8 r1][r8 r2][r8 r3] | r3 = t1? r1:r2 |
| jcc[r32 t0][][r32 t1] | N/A |
| ldm[r32 t1][][r8 t2] | t2 = [t1] |
| lsh[r32 t1][i16 4][r64 t2] | t2 = t1 << 4 |
| mod[r32 t0][r32 t1][r32 t2] | t2 = t0 % t1 |
| mul[r32 t1][r32 t2][r64 t3] | t3 = t2 * t1 |
| nop[][][] | N/A |
| or[r32 t1][i32 4][r32 t2] | t2 = t1 \| 4 |
| rsh[r32 t1][i32 5][r64 t2] | t2 = t1 >> 5 |
| stm[r8 t1][][r32 t2] | [t2] = t1 |
| str[r32 t1][][r32 t2] | t2 = t1 |
| sub[r32 t1][i32 4][r64 t2] | t2 = t1 − 4 |
| undef[][][r32 r1] | N/A |
| unkn[][][] | N/A |
| xor[r32 t1][i32 4][r32 t2] | t2 = t1 ^ 4 |

TABLE 3: EQUIVALENT TRANSFORMATION OPERATION

| x86 | PREIL | TMF |
|---|---|---|
| push eax | sub[r32 esp][i32 4][r32 esp] | esp = esp - 4 |
|  | stm[r32 eax][][r32 esp] | [esp] = eax |

| x86 | TMF | |
|---|---|---|
| push eax | esp = esp - 4 | (3) |
|  | [esp] = eax | (4) |
|  | *Replace esp in (4) with esp on left-hand side of (3) | |
|  | [esp-4]= eax | (5) |

TABLE 4: MODELING NATIVE INSTRUCTION x86
FIG. 6

700

```
seq_of_preils: given list of preils
inputs = () #empty list of inputs
map = {} #map of outputs and their epxressions
for preil in seq_of_preils:
tmf_exps = modeling(preil) #modeling preil
for tmf in tmf_exps:
ins, out, exp = obtainInsOuts(tmf)
for _in in ins:
if _in in map.keys():
map[_in] = exp.replace(_in, map[_in])
else:
inputs.append(_in)
map[out] = exp
#after this for loop, the input list and map should be filled in.
```

TABLE 5: AGGREGATION ALGORITHM

FIG. 7

SINGLE PATH MODELLING

900

| Table 6: Single Path Aggregation |
|---|
| Condition: [ebp+0x8]-[ebp+0xc] ≤ 0 |
| Expressions: |
|     [ebp-0x8]=[ebp+0x8]-[ebp+0xc] |
|     edx=[ebp+0xc] |
|     [ebp-0x4]=[ebp+0xc] |
|     eax=[ebp+0xc] |

TABLE 6: SINGLE PATH AGGREGATION

FIG. 9

MULTI-PATH MODELLING

1100

TABLE 7: MULTI-PATH AGGREGATION

1200

TABLE 8: XML VERSION OF AGGREGATION OF MAX FUNCTION

1300

LOOP AND ITS TMFs

1400

```
<tmf>
  <path text="...">
    <segment>
      <loop>
        <segment>
          </exps>
          <conds>
            <exit_cond>...</exit_cond>
            <conds>...</conds>
          </conds>
        </segment>
        <segment>
          </exps>
          </conds>
        </segment>
      </loop>
    </segment>
  </path>
</tmf>
```

TABLE 9: LOOP TMF SKELETON <tmf>

```
<tmf>
  <path text="base case">
    <segment>
      <exps>
        <exp>...</exp>
      </exps>
      <conds>
        <cond>...</cond>
      </conds>
    </segment>
  </path>
  <path text="...">
    <segment>
      <exps>
        <exp>...</exp>
      </exprs>
      <conds>
        <call>itself</call>
        <cond>...</cond>
      </conds>
    </segment>
  </path>
</tmf>
```

TABLE 10: RECURSION TMF SKELETON

```
push    ebp
mov     ebp, esp
sub     esp, 14h
mov     [ebp+var_14], 1FFFFFFFh
lea     eax, [ebp+var_10]
push    eax
push    offset Format  ; "%d"
call    ds:scanf
add     esp, 8
lea     edx, [ebp+var_10], 1
```

1605

1620

```
loc_E61080:
mov     eax, [ebp+arg_10]
add     eax, [ebp+arg_8]
add     eax, [ebp+arg_4]
mov     [ebp+var_C], eax
cmp     [ebp+var_C], 4
jl      short loc_E610B1
```

1615

1610

```
cmp     [ebp+var_C], 5
jg      short loc_E610B1
```

```
jmp     short loc_E6108F
```

```
loc_E6101: ;"sun:0\n"
push    offset aSun0
call    ds:printf
add     esp, 4
```

```
loc_E6106D: ; "error: number out of bound\a"
push    offset aErrorNumberOut
call    ds:printf
add     esp, 4
or      eax, 0FFFFFFFFh
jmp     short loc_E610C1
```

```
mov     ecx, [ebp+var_C]
push    ecx
push    offset aSumD;"sum:%d\n"
call    ds:printf
add     esp, 8
mov     eax, [ebp+var_C]
jmp     short loc_E610C]
```

```
loc_E6108F:
xor     eax, eax
```

CONSTRAINT GENERATION ILLUSTRATION

FIG. 16

DATA FLOW ANALYSIS

BUFFER OVERFLOW BUG SEARCH

RANGE AND DOMAIN ANALYSIS OF A FUNCTION

ILLUSTRATION OF TASK-ORIENTED PATH PRUNING

2100

2105

```
7C809AE6  push    dword ptr [ebp+14h]
7C809AE9  push    dword ptr [ebp+10h]
7C809AEC  push    dword ptr [ebp+0Ch]
7C809AEF  push    dword ptr [ebp+8] ;
7C809AF2  push    0FFFFFFFFh         ; hi
7C809AF4  call    VirtualAllocEx
```

VirtualAllocEx CALLED IN APPLICATION

FIG. 21

AUTOMATED REVERSE ENGINEERING

STATEMENT OF GOVERNMENT INTEREST

Portions of the present invention have been made in conjunction with Government funding under contract number N66001-13-C-4047 (US DEPARTMENT OF THE NAVY), and there are certain rights to the Government.

FIELD OF THE DISCLOSURE

Embodiments relate to automatically processing low-level computer languages (native machine code) and corresponding execution traces to capture the semantics of binary applications in platform-independent representations and then use those representations to reverse engineer and perform cyber-security analysis of the applications to find hidden malicious code.

BACKGROUND

Assembly language and machine code are low-level, difficult-to-understand burdens for cyber security analysts who reverse engineer binary applications to find hidden malicious code. The problem with reading low-level languages is the complexity of capturing semantics from the code. This results in a time-consuming process for analyzing malware, whereas malicious software can be generated automatically. The imbalance between generating and detecting malevolent software currently puts the cyber security industry at a persistent disadvantage.

Software development is a complex process. Software errors or 'bugs' are unavoidable in developing applications. Testing procedure becomes increasingly important to detect the existing and potential bugs. Designing comprehensive test suites, however, is infeasible for any sizable application. Detecting bugs through human inspection of source code is hard. Detecting bugs without source code is even harder due to the complexity and challenge of reasoning about what low-level assembly code and machine code is doing. Automated bug detection techniques currently are limited to mechanical detection of potentially problematic syntax (not semantics), limited to a single type of bug, and/or limited to heuristic algorithms that produce significant false positives and false negatives.

What is needed is a method and system to automate reverse engineering to capture and perform static analysis on all runtime code for an executable; get instruction traces without instrumenting and running the target system; automate reasoning and pattern recognition against the semantics of executable binaries; determine all variables and code branches that are affected by program input; and find feasible application inputs to reach a desired Point-of-Interest (POI) in the executable. Additionally, to find software bugs or vulnerabilities, harden software, test software, and understand and fix software where the original source code is missing.

SUMMARY

An embodiment provides a method performed by at least one computer processing unit for reverse engineering analysis of binary applications the method comprising the steps of inspecting binary files from a target application; translating native instructions of the target application into an intermediate language Power Reverse Engineering Intermediate Language (PREIL); transforming and aggregating the PREIL instructions by a Taint Modeling Function (TMF); and producing output reports identifying undesirable coding patterns in an entire application space. Embodiments comprise preprocessing the translated native instructions into platform-independent PREIL instructions. In other embodiments pre-processing is computed once. In subsequent embodiments TMF forms higher-level semantic expressions from PREIL lists. For additional embodiments TMF transforming and aggregating comprises modeling each PREIL instruction as an algebraic expression and then aggregating the algebraic expression to form TMF expressions. In another embodiment aggregation occurs at multiple levels, comprising instruction, basic block, single path, multiple path, loop, and function levels, capturing relationships between inputs and outputs. For a following embodiment, TMF retains all relevant semantic information such as constraints that have an influence on a desired path, and wherein abstraction is lossless. In subsequent embodiments preprocessing optionally incorporates additional data from dynamically obtained traces at a point of the traces. Additional embodiments further comprise a taint engine (TE), wherein the taint engine traces all values and code branches from a designated program input, storing input ancestry at each instruction or branch. In included embodiments analysis is static and optionally uses dynamically obtained traces to fill in gaps in executable control flow understanding. In yet further embodiments aggregation finds directed relations between inputs and outputs from a list of TMF expressions. In related embodiments TMF comprises transforming PREIL instructions and relevant data structures into algebraic expressions and using them in applications comprising constraint generation, mathematical representation, data flow analysis, exploratory bug searches, range and domain analysis, path pruning, and return-oriented programming. For further embodiments pre-processing automatically compares resulting PREIL with executing binary, and makes corrections to provide an accurate static representation. In ensuing embodiments introspection comprises obtaining only an initial state of application memory and registers.

Another embodiment provides a system for reverse engineering analysis of binary applications to find hidden malicious code comprising a processor; memory coupled to the processor, wherein the memory includes an analysis module to inspect binary files from a target application; translate native instructions into an intermediate language Power Reverse Engineering Intermediate Language (PREIL); transform and aggregate the PREIL instructions by a Taint Modeling Function (TMF); process output of the TMF in a main loop comprising PREIL emulation, Taint analysis, and a dynamic behavior sensor; and produce output reports identifying undesirable coding patterns in the entire application space. For yet further embodiments, TMF is an architecture-independent machine-readable format that captures application control flow, and substantially eliminates semantically irrelevant instructions for efficient automated analysis. For more embodiments, a Taint Engine (TE) pre-calculating relevant data pedigrees, allowing efficient queries on Taint, plus both forward and backward Taint tracing. In continued embodiments Constraint Optimization, Management, Extensions, and Translation System (COMETS) and TMF solve mathematically for feasible code execution paths, identifying all feasible paths from input data to any point of interest in the binary applications. For additional embodiments Constraint Optimization, Management, Extensions, and Translation System (COMETS) solves for a set of input values that cause any particular code branch to be taken, resulting in specific input values that result in execution of all branches needed to reach a point of interest, or else COMETS reports that no input can reach the point of interest.

A yet further embodiment provides a non-transitory computer-readable storage medium including instructions that are configured, when executed by a computing system, to perform a method for reverse engineering analysis of binary applications by reading low-level languages to capture semantics from code for analysis to find hidden malicious code, the method comprising preprocessing binary files from a target application; translating native instructions into an intermediate language Power Reverse Engineering Intermediate Language (PREIL); transforming and aggregating the PREIL instructions by a Taint Modeling Function (TMF); producing output reports identifying undesirable coding patterns in the entire application space; whereby analyses can then be conducted manually or with software tools that support data flow analysis, exploratory bug searches, or constraint generation.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

BRIEF DESCRIPTION OF THE DRAWINGS

FIG. 3 is a Table 1: example of PREIL instructions configured in accordance with an embodiment.

FIG. 4 is a Table 2: PREIL translation of x86 "push eax" configured in accordance with an embodiment.

FIG. 5 is a Table 3: equivalent transformation operation configured in accordance with an embodiment.

FIG. 6 is a Table 4: modeling native instruction x86 configured in accordance with an embodiment.

FIG. 7 is a Table 5: aggregation algorithm configured in accordance with an embodiment.

FIG. 9 is a Table 6: single path aggregation configuration configured in accordance with an embodiment.

FIG. 14 is a Table 9: loop TMF skeleton <tmf> configured in accordance with an embodiment.

FIG. 15 is a Table 10: recursion TMF skeleton configured in accordance with an embodiment.

FIG. 16 is a constraint generation illustration configured in accordance with an embodiment.

FIG. 21 depicts a VirtualAllocEx called in application configured in accordance with an embodiment.

Figure 1:
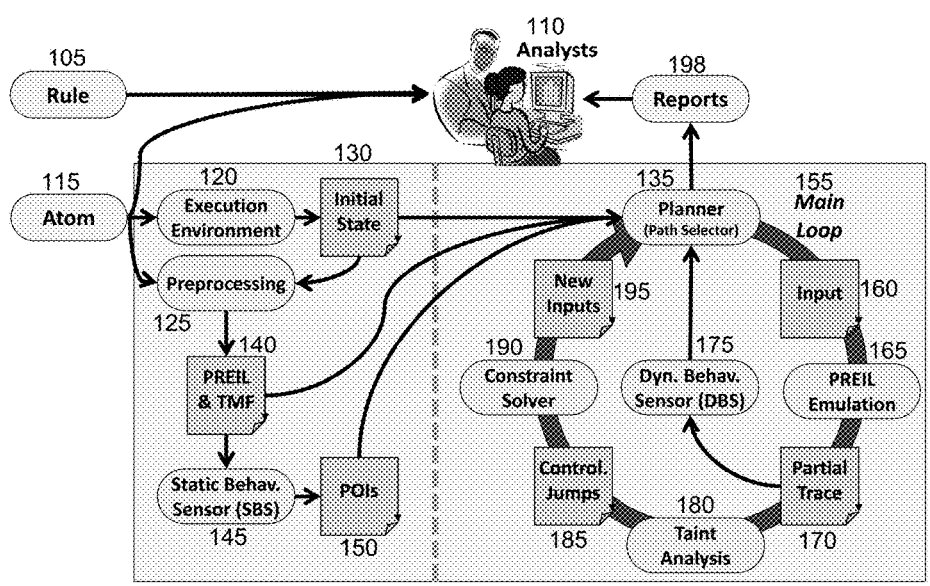
FIG. 1 is a high level view configured in accordance with an embodiment of the invention.

These and other features of the present embodiments will be understood better by reading the following detailed description, taken together with the figures herein described. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

Static analysis of binary executables has an ability to analyze software without relying on source code which may be unavailable. Binary code static analysis techniques vary widely from single processes such as disassembly, program slicing, and de-obfuscation to frameworks such as CodeSurfer/x86, Phoenix, and BAP.

Taint Modeling Function (TMF), abstracts binary code for software analysis. TMF transforms the binary executables to sets of precise algebraic expressions in conjunction with the intermediate language Power Reverse Engineering Intermediate Language (PREIL). PREIL simplifies and disambiguates native language. The lossless abstraction of binary codes via algebraic expressions makes it possible to automate static analysis tasks such as detecting defective code patterns, generate constraints to find needed inputs for desired paths, and narrowing search space for potential bugs. The expressions are also simple to analyze to understand the target software inside-out via querying TMF expressions in a database. The automated application of TMF balances the current imbalance of generating-versus-detecting malevolent software by speeding up the process of bug finding; alleviating users from that tedious and difficult task.

Taint Modeling Function (TMF)

Taint Modeling Function (TMF) is a novel technique that models binary code as sets of algebraic expressions. The mathematical model of the binary is compatible with mathematical toolkits such as MATLAB which enable TMF's predictive power. A TMF model serves as a behavioral model of a target application. The behavioral modeling characteristics of TMF enable it to statically and automatically detect bad behaviors of malicious or defective code hidden in largely benign binary code. TMF is a tool that lifts assembly instructions to an intermediate language.

Power Reverse Engineering Intermediate Language (PREIL)

PREIL (Power Reverse Engineering Intermediate Language), an extension to REIL, is used to avoid the profusion and ambiguity of native languages such as x86. PREIL plays an important role in TMF modeling. After an application is translated into PREIL instructions and relevant data structures, TMF transforms them into algebraic expressions and uses them in a wide range of applications such as constraint generation, mathematical representation, data flow analysis, exploratory bug searches, range and domain analysis, path pruning, and return-oriented programming.

The following sections discuss in detail the process of disassembling binary code, PREIL translation, TMF transformation, and practical applications such as using abstract expressions to find bugs statically and systematically.

Embodiments comprise the following five components: one, PREIL (Power Reverse Engineering Intermediate Language) and Preprocessing; two, emulated traces from executing PREIL; three, Taint Modeling Function (TMF)—TMF reduces an executable's instructions from PREIL to a minimal algebraic representation of control flow; four, Taint Engine (TE)—TE traces all values and code branches from a designated program input, storing the input ancestry at each instruction or branch; and five, Constraint Optimization, Management, Extensions, and Translation System (COMETS). COMETS and TMF are used to create constraint solver problems that evaluate execution paths and solve for inputs that follow those paths. COMETS is a front-end to well-known third-party constraint solvers such as STP and z3. COMETS uses TMF to produce constraint problems in a form that the constraint solvers can understand. The formulated constraint problems seek binary-application inputs that cause the binary application to follow a specific execution (control-flow) path and/or reach a specific Point of Interest (POI) within the binary code.

The following further elaborates advantages of embodiments. First, PREIL extends standard REIL to fill in gaps left by other REIL implementations. PREIL is fully executable. Pre-Processing includes any relevant dynamically-loaded libraries and jump tables (normally invisible to disassemblers) with the static binary to achieve full code coverage before translating the application instructions to PREIL and TMF. Pre-Processing automatically compares the resulting PREIL with the executable binary, and makes corrections to guarantee an accurate static representation. Second, embodiments require only enough introspection to obtain an initial state of application memory and registers. Instruction traces are then easily obtained by emulated execution of the PREIL, eliminating technical challenges and performance impacts of true run-time introspection, and making test iterations with varying input values extremely efficient. Third, TMF is an architecture-independent machine-readable format that captures the application control flow, and eliminates semantically irrelevant instructions through algebraic simplification for efficient automated analysis. Without the simplification of TMF, automated analysis, even of PREIL, becomes computationally intractable. Fourth, calculating input data pedigree is computationally expensive, even with storage of instructions in high-performance non-relation (no-SQL) databases. TE pre-calculates the relevant data pedigrees, and allows efficient queries on Taint, plus both forward and backward Taint tracing. Fifth, COMETS and TMF solve mathematically for feasible code execution paths, efficiently identifying all feasible paths from input data to any POI in the binary. COMETS solves for the set of input values that cause any particular code branch to be taken, resulting in specific input values that result in execution of all branches needed to reach the POI, or else COMETS reports that no input can reach the POI.

FIG. 1 is a high level view 100 of an embodiment of the invention. Rules 105 are human-readable rules for Analysts 110 where the rules describe the desired reverse engineering and vulnerability analysis to perform against Atom 115. Atom 115 consists of the binary executable and supporting binary libraries that make up the binary application and provides input to Analysts 110, Execution Environment 120, and Preprocessing 125. Initial State 130 receives input from Execution Environment 120, and outputs to Preprocessing 125 and Planner (Path Selector) 135. Preprocessing 125 provides input to PREIL & TMF 140; PREIL & TMF 140 provide input to Planner 135 and Static Behavior Sensor (SBS) 145. Static Behavior Sensor 145 identifies syntactic and semantic constructs in the TMF representations indicative of potential bugs and vulnerabilities and provides input to POIs 150. In Main Loop 155, Planner (Path Selector) 135 leads to Input 160 which leads to PREIL Emulation 165 leading to Partial Trace 170. Partial Trace 170 provides input to Dynamic Behavior Sensor (DBS) 175 and Taint Analysis 180. Taint Analysis 180 provides input to Control. Jumps 185 which leads to Constraint Solver 190 leading to New Inputs 195; returning to Planner (Path Selector) 135 then proceeding to Reports 198 for Analysts 110.

Figure 2:
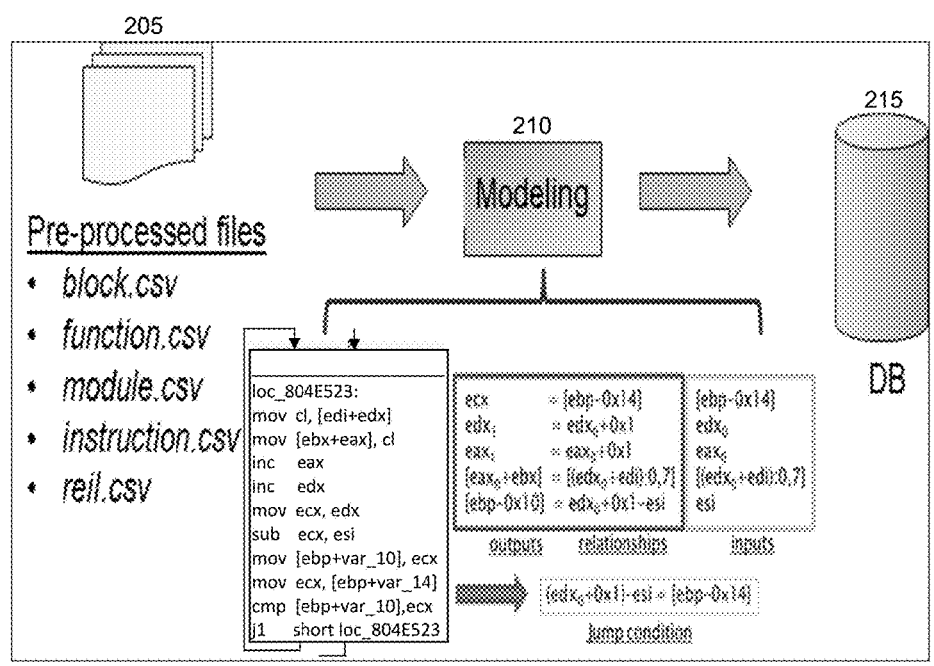
FIG. 2 depicts analysis transformation configured in accordance with an embodiment.

FIG. 2 presents transforming a binary executable to algebraic expressions using TMF 200. TMF is the process of transforming binary code to a set of mathematical functions consisting of algebraic expressions that describe software behaviors. The process of disassembling a target application, and its externally linked libraries, and translating native assembly instructions to PREIL is preprocessing 205. Preprocessing 205 returns data structures and PREIL instructions that form a complete as possible representation model 210 of an entire application. PREIL instructions are then transformed into algebraic expressions which are then written to database 215. Database 215 also holds application structures such as functions, blocks, and loops which are subject to queries that support analyses of the target application. Analyses can then be conducted manually or with software tools that support data flow analysis, exploratory bug searches, or constraint generation. The only prerequisite for TMF transformation is preprocessing. The key task of preprocessing is PREIL translation.

FIG. 3 is a table, Table 1, of example PREIL instructions 300. Assembly languages tend to have large instruction sets. For example, x86 has more than 300 instructions with most of the instructions performing implicit operations (side effects) in addition to the explicit operation, which make it harder to analyze. PREIL, in contrast, has only 20 instructions, and all operations are explicit. As mentioned, PREIL is the Power-REIL enhancement to REIL, the Reverse Engineering Intermediate Language from the BinNavi manual. PREIL offers improved support for static analysis and instructions that BinNavi does not accurately translate. TMF constructs its algebraic expressions from PREIL instructions. The construction is platform independent because PREIL is platform independent.

Examples that cover the essentials of PREIL are described in FIG. 3, which is a table, Table 1. Note that each nonempty operand begins with either an "r" (for register), "i" (for integer literal), or "o" (for instruction offset) followed by a size in bits, e.g., "r32" for a 32-bit register. Note that PREIL also allows a non-empty operand to begin with "m" (for memory address), but this type of operand is rarely needed.

FIG. 4 is a table, Table 2, illustrating PREIL Translation of x86 "push eax" 400. Since PREIL does not allow side effects, the process of translating native instructions to PREIL instructions exposes the implicit operations in native languages such as x86, PowerPC, and ARM assembly. For instance "push eax" involves pushing register "eax" to the stack after decrementing the stack pointer "esp" by 4 bytes. The decrement operation is implied by the instruction. However, PREIL instructions explicitly include them as shown in Table 2.

Some x86 instructions have long translations, e.g., "sub" modifies the carry, parity, adjust, zero, sign, and overflow flags in addition to the subtraction destination. In practice, irrelevant operations (e.g., writes that cannot be read) may be optimized away.

The following subsections describe PREIL in greater depth.

Differences from REIL

Whereas REIL supports only a single memory with fixed endianness, PREIL enables multiple memories for code (e.g., "unit.bochs" for routines from the Bochs software floating-point engine) and data (e.g., "data.port" for the processor's I/O address space) with settings such as "unit.error:setup=<PREIL list>" (for unit initialization instructions), "data.port:address.size=16" (for a maximum address of 216-1), "enum:endian=little big" (to associate "endian.little" with 0 and "endian.big" with 1), and "data.main:byte.order=endian.little" (or equivalently, "data.main:byte.order=0"). REIL treats temporary registers the same as machine registers but PREIL restricts their scope to a PREIL list where they can only be written once and must be written before they are read. REIL enables jumps to any REIL instruction but PREIL prevents jumps to earlier instructions in a PREIL list and instructions that are not at the start of other PREIL lists. These restrictions enable processing tools to be faster and simpler.

REIL has six arithmetic instructions (add, sub, mul, div, mod, and bsh) but PREIL replaces bsh (binary shift) with lsh and rsh to ease interpretation. Both have only 3 bitwise instructions (and, or, and xor) since one's complement is derived from xor. REIL has 2 conditional instructions (bisz and jcc) and PREIL adds 2 more (ifm and ifr) to efficiently handle localized conditional expressions. While both have 3 data transfer instructions (ldm, stm, and str) and 3 other instructions (undef, unkn, and nop), PREIL extends some of these (e.g., str can modify settings).

REIL measures sizes in terms of bytes but, for better accuracy, PREIL uses bits. Register operands in REIL must refer to entire registers but, for shorter translations, PREIL operands can refer to a range of bits (e.g., in x86-32, "eax:0,7" for register al, "eax:8,15" for register ah, and "t3:1" for the second lowest bit of temporary register t3). However, to help avoid partially unknown values, the output operand cannot be a range for a temporary register. Bit ranges can also be used in settings (e.g., to simply use al in PREIL operands, set "alias:al" to "eax:0,7"). Another PREIL feature that enables shorter translations than REIL is operand sizing rules that follow the C conventions for unsigned integers.

Instruction Semantics

"add[o1][o2][o3]" writes to the register in operand o3 the sum of the values in literal or register operands o1 and o2. Though REIL requires o3 to be large enough to handle potential overflows, PREIL follows the C convention for unsigned conversions.

"and[o1][o2][o3]" writes to the register in o3 the AND of the literals or registers in o1 and o2 (after sizing them to match o3).

"bisz[o1][ ][o3]" writes to the register in o3 the logical negation of the literal or register in o1, i.e., it writes 1 if o1=0 or 0 if o1≠0.

"div[o1][o2][o3]" writes to the register in o3 the result of dividing the literal or register in o1 by the literal or register in o2.

"ifm(oc [o0])[o1][o2][o3]" is abbreviated as "ifm(oc)[o1][o2][o3]" if operand o0 is empty. If the register in operand oc is nonzero (i.e., true) and o1 is nonempty, this is equivalent to "stm[o1][o0][o3]". If the register in oc is zero (i.e., false) and o2 is nonempty, this is equivalent to "stm[o2][o0][o3]". Otherwise, this is equivalent to "nop[ ][ ][ ]". For example, "ifm(r4 eax)[r64 t1][i16 9][r32 t2]" stores the 8 byte value of t1 at the address specified by t2 if eax≠0. Otherwise, the 2 byte value 0x0009 is stored at that address.

"ifr(oc [o0])[o1][o2][o3]" is abbreviated as "ifr(oc)[o1][o2][o3]" if operand o0 is empty. If the register in operand oc is nonzero and o1 is nonempty, this is equivalent to "str[o1][o0][o3]". If the register in oc is zero and o2 is nonempty, this is equivalent to "str[o2][o0][o3]". Otherwise, this is equivalent to "nop[ ][ ][ ]". For example "ifr(r1 PF)[r80 t1][ ][r80 st0]" copies the 10 byte value of t1 to st0 if PF is set. Otherwise, st0 is not modified.

"jcc[o1][o2][o3]" jumps to the target address specified by the literal, offset, or register in o3, within the segment specified by the literal or register in o2, if the literal or register in o1 is nonzero. If o2 is empty, o3 can be empty (to jump to the end of the current PREIL list), a literal or register (for a target machine address in the current unit), an offset (to skip the given number of PREIL instructions without leaving the current PREIL list), or "r0<label>" (to jump to the first instruction occurring later in the current PREIL list that is of the form "nop[r0<label>][ ][ ]"). If o2 is of the form "r0<unit>", o3 can be of the form "r0<block>" for the target address specified by the "<unit>:<block>:at" setting. This is useful for virtual routines to handle errors, interrupts, floating-point, SSE instructions, and so on.

"ldm[o1][o2][o3]" writes to the register in o3 the contents of memory starting at the address specified by the literal or register in o1 within the segment specified by the literal or register in o2 (if o2 is nonempty). The size of o3, which must be a multiple of 8, determines how many bytes are read from memory. The "<data>:byte.order" setting determines the endianness where <data> is "data.main" unless o2 is of the form "r0<data>". This is useful for ports, volatile memory, register banks, and so on.

"lsh[o1][o2][o3]" writes to the register in o3 the result of left shifting the literal or register in o1 by the literal or register in o2.

"mod[o1][o2][o3]" writes to the register in o3 the result of the literal or register in o1 modulo the literal or register in o2.

"mul[o1][o2][o3]" writes to the register in o3 the product of the literals or registers in o1 and o2.

"nop[o1][ ][ ]" does nothing if o1 is empty, sets a jump target if o1 is of the form "[r0<label>]" where <label> begins with "label.", executes the PREIL list specified by setting "<macro>:code" if o1 is of the form "[r0<macro>]" where <macro> begins with "macro.", or considers o1 a comment if it is anything else. A macro may call another macro, but cannot eventually call itself.

"or[o1][o2][o3]" writes to the register in o3 the (inclusive) OR of the literals or registers in o1 and o2.

"rsh[o1][o2][o3]" writes to the register in o3 the result of logically right shifting the literal or register in o1 by the literal or register in o2, i.e., vacated bits are zero-filled.

"stm[o1][o2][o3]" writes the contents of the literal or register in o1 to memory, starting at the address specified by the literal or register in o3, within the segment specified by the literal or register in o2 (if o2 is nonempty). The size of o1, which must be a multiple of 8, determines how many bytes are written to memory. The "<data>:byte.order" setting determines the endianness where <data> is "data.main" unless o2 is of the form "r0<data>".

"str[o1][ ][o3]" writes to the register in o3 the contents of the literal or register in o1. The value for o1 is truncated or zero-extended to the size of o3 as needed. A setting such as "current.unit" is read when o1 is of the form "r0<setting>", and a setting such as "data.main:byte.order" is updated when o3 is of the form "r0<setting>". This is useful for bi-endian architectures.

"sub[o1][o2][o3]" writes to the register in o3 the result of subtracting the literal or register in o2 from the literal or register in o1.

"undef[ ][ ][o3]" marks the register in o3 as undefined until it is written again. This is useful for confidence measures.

"unkn[ ][ ][ ]" indicates an unknown operation. This is useful when the PREIL translation is incomplete.

"xor[o1][o2][o3]" writes to the register in o3 the XOR of the literals or registers in o1 and o2, i.e., it performs an exclusive or.

Preprocessing

Preprocessing is the process of disassembling binary code into native assembly instructions and its structures. The disassembly uses the standard IDA (Interactive Disassembler) Pro tool that statically analyzes binary code and breaks it down to functions, basic blocks, and instructions. Preprocessing then converts native instructions to PREIL, and links external libraries to ensure the static analysis will cover as much as possible of the application space. If available, preprocessing also uses dynamic execution traces to rebase addresses, resolve jump tables, load external references, and reconcile differences such as instructions that IDA Pro erroneously marked as data. Note that preprocessing results can be computed once and reused many times.

TMF Transformation

TMF transformation has two steps: (1) modeling each PREIL instruction as algebraic expressions, and (2) aggregating them to TMF expressions. The aggregation can happen at different levels, from instruction to function level. For embodiments, the aggregation step is necessary to abstract the target application as much as possible while losslessly maintaining its original meaning.

Modeling PREIL Instructions

Modeling a single PREIL instruction captures the semantics of the instruction algebraically. As shown in FIG. 3 Table 1, almost every PREIL instruction has one operator and three operands: two input operands and one output operand. The transformation operation varies depending on PREIL operator. For instance, if the PREIL operator is sub, then the transformation operation is subtraction.

FIG. 5 is a table, Table 3, showing the equivalent transformation for each PREIL instruction 500. For example, consider the following:

$$sub[r32 esp][i32\ 4][r32 esp] \text{ transforms to } esp=esp-4 \quad (1)$$

$$stm[r32 eax][\ ][r32 esp] \text{ transforms to } [esp]=eax \quad (2)$$

The square brackets [and] indicate pointer dereferencing so [esp] is the top slot on the stack pointed to by stack pointer esp.

Expression (1) indicates that the value of esp is decreased by 4. Notice that there are two instances of esp in a single expression. The esp on right hand side is the input esp and the one on the left is the output esp for the updated value. In general, all entities on the right hand side are inputs and all those on left hand side are outputs in the current scope. Expression (2) indicates the memory location pointed to by stack pointer esp obtains value of register eax. In other words, eax is stored on the stack located by stack pointer esp.

Modeling Native Instructions

FIG. 6 is a table, Table 4, illustrating the modeling of a native instruction 600. A native instruction is translated into several PREIL instructions. The aggregation of the TMF expressions for those PREIL instructions represents the modeling of a native instruction.

The native instruction "push eax" is translated into two PREIL instructions: "sub[r32 esp][i32 4][r32 esp]" and "stm[r32 eax][ ][r32 esp]". These instructions are modeled as "esp=esp−4" and "[esp]=eax". After replacing esp in (4) by that in (3), we have "[esp−4]=eax". This expression means the value of eax is put on the stack when the stack pointer is decreased by 4. A single expression expresses two operations explicitly. That is the benefit of TMF.

TMF Aggregation

In previous section, we have seen an aggregation at instruction level. The aggregation allows one to see the meaning of an instruction better without any implicit operations. It provides a capability to understand the otherwise cryptic assembly instructions. The aggregation can also be implemented with multiple instructions and at higher levels such as blocks and functions. The aggregation yields a set of expressions that expose the relationships between inputs and outputs in a sequence of instructions.

Aggregation of Sequence of Instructions

Aggregation of a sequence of instructions has same principle as that of a single instruction. Aggregation of instruction I is a set of expressions expi={expi1, . . . , expin}. Aggregation of instruction J right before I is another set of expressions expj={expj1, . . . , expjm}. The aggregation of both instructions I and j is a new set of expressions expk={expk1, . . . , expkn} where some of terms in right-hand side of expressions in expk are left-hand side terms of expj.

The purpose of aggregation is to find the most directed relations between inputs and outputs from a list of TMF expressions (or TMFs for short).

Assume we have TMF for a scope f (f could be a block or a function) outi=f(ini1, . . . , inin). g is another scope that includes output of f as part of its inputs outj=g(inj1, . . . , outi, . . . , injm). Output of an expression could become input of another expression. This process is called aggregation.

$$outi = f(ini1, \ldots, inin)$$

$$outj = g(inj1, \ldots, outi, \ldots, injm)$$

$$= g(inj1, \ldots, f(ini1, \ldots, inin), \ldots, injm)$$

$$= gagg(ini1, \ldots, inin, inj1, \ldots, injm)$$

Aggregation results in a set of direct expressions between inputs and outputs in a scope.

Aggregation Algorithm

FIG. 7 is a table, Table 5, that presents aggregation algorithm 700 which starts from a list of PREIL instructions in order. For each instruction, a modeling process occurs that translates a single PREIL to a TMF expression. The TMF expression, in turn, goes through a process to determine its inputs and outputs. The output is a left-hand side term. The inputs are terms that constitute the expression.

For instance, the expression $$eax=[ebp+0x5]-ebx \quad (6)$$

has $$eax \text{ as its output} \quad (7)$$

$$ebx \text{ and } [ebp+0x5] \text{ are its inputs.} \quad (8)$$

Note that [ebp+0x5] means dereference of a pointer represented by ebp+0x5. As said in the Aggregation of Sequence of Instructions Section, the output of an expression could become the input of another expression; a process of replacing inputs with outputs happens that transforms the set of TMF expressions into a smaller set whose expressions are more comprehensive and complete. Assume the inputs (8) above are in fact the outputs of previous expressions such as $$ebx=0x5 \tag{9}$$

$$[ebp+0x5]=ecx+edx \tag{10}$$

Replace input of (6) with outputs of (9) and (10), we have the final aggregated expression where eax is output and ecx, edx are inputs:

$$eax=ecx+edx-0x5$$

Levels of Aggregation

Aggregation can happen at six different levels: instruction, basic block, single path, multiple path, loop and function. No matter at what level, the aggregation still follows the same algorithm described in FIG. 7, Table 5. The instruction level aggregation is discussed in the Aggregation of Sequence of Instructions Section. The rest of the levels will be discussed in next sections.

Basic Block Aggregation

Basic block is a list of consecutive assembly instructions whose first instruction is the only entry, and last instruction is the only exit. Basic block aggregation starts from the last instruction and goes upward. The inputs of one instruction could be obtained from outputs of instructions that are above it, as described in the Aggregation of Sequence of Instructions Section. The outcome of aggregation of the whole block is a set of expressions which describe the behaviors of the block. The set of expressions has predictive power, i.e., given some inputs, the expressions can predict precisely what outputs should be without executing the instructions. Execution has been replaced by computation. To illustrate the aggregation at this level, let us consider a simple basic block as:

$$mov\ eax,[ebp+0x8] \tag{11}$$

$$sub\ eax,[ebp+0xc] \tag{12}$$

$$mov[ebp-0x8],eax \tag{13}$$

$$cmp[ebp-0x8],0 \tag{14}$$

$$jle0x40101d \tag{15}$$

This block obtains two numbers from two arguments [ebp+0x8] and [ebp+0xc] (11 and 12). The second number is subtracted from first number and the difference is compared with value 0x0 (12, 13 and 14). If the difference is not positive, jump to address 0x40101d (15), otherwise execute next instruction which is not shown in the sample yet. The modeling of the basic block is done via PREIL and presented as:

$$eax=[ebp+0x8] \tag{from 11}$$

$$eax=eax-[ebp+0xc]=[ebp+0x8]-[ebp+0xc] \tag{from 12}$$

$$[ebp-0x8]=eax=[ebp+0x8]-[ebp+0xc] \tag{from 13}$$

$$if\ [ebp+0x8]-[ebp+0xc]\leq 0x0\ then \tag{from 14}$$

$$jump\ to\ 0x40101d \tag{from 15}$$

The aggregation of the basic block in question now is:

$$eax=[ebp+0x8]-[ebp+0xc] \tag{16}$$

$$[ebp-0x8]=[ebp+0x8]-[ebp+0xc] \tag{17}$$

Summary of the two TMF expressions is: the basic block has two inputs [ebp+0x8], [ebp+0xc] and two outputs eax, [ebp−0x8]. The relationships between inputs and output are described in (16) and (17). These expressions model the behavior of the block which is finding the difference of two numbers. The difference will dictate what instruction (or block) to execute next, i.e., if the difference is positive or negative. This expression has predictive power where it can tell what the next block should be, given values of the two inputs without executing instructions in the block.

Basic block aggregation is fundamental in aggregating higher levels. At higher levels, a list of instructions can be divided into a list of basic blocks and the aggregation at the higher levels is the aggregation of aggregated basic blocks. The next aggregation level is the single path aggregation.

Single Path Aggregation

Figure 8:
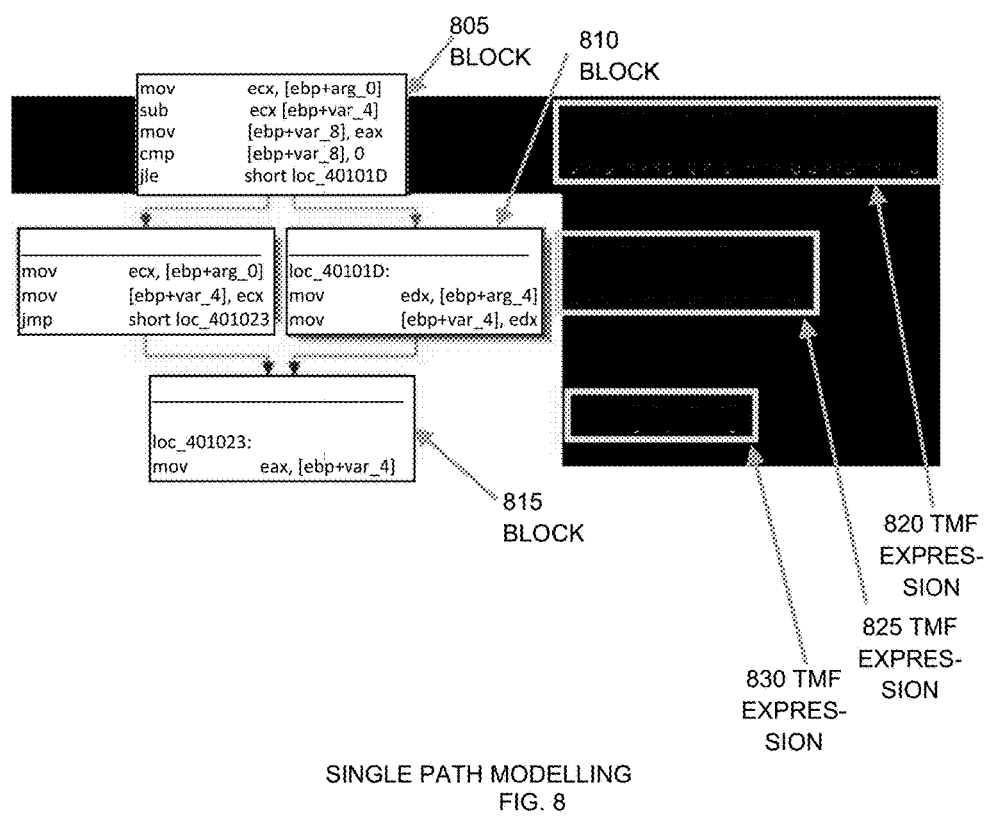
FIG. 8 depiction of single path modelling configured in accordance with an embodiment.

FIG. 8 describes a three-block path for single path modelling 800. Single path is a list of basic blocks that are executed in sequence (in this case the three blocks 805, 810, and 815). This happens with dynamic execution whose inputs cause the blocks in the path to be executed. The executed path is examined in the aggregation process.

Aggregation of a path is the aggregation of its consecutive aggregated blocks. Each block is aggregated separately as discussed in the Basic Block Aggregation Section, and the aggregation on these block-level aggregations is called aggregation of a single path. To illustrate the process, select the TMF expressions corresponding to the assembly code in rectangles 820, 825, and 830 in FIG. 8 and aggregate them. First block 805 has eax and [ebp−0x8] as outputs. The condition to have next block 810 executed at this block is [ebp−0x8]≤0 or [ebp+0x8]-[ebp+0xc]≤0. Second block 810 has edx and [ebp−0x4] as outputs. The outputs of first block 805 and inputs of second block 810 have nothing in common, so no aggregation is necessary. The only expression in third block 815 that needs attention is where its output eax is replacing the current value of eax in first block 805 and its input [ebp−0x4] is output of the second expression in the second block 810. Aggregating them altogether as in the algorithm in FIG. 7 Table 5, should yield eax=[ebp+0xc]. Single path aggregation of FIG. 8 is finalized in FIG. 9, Table 6.

FIG. 9, Table 6, depicts finalized single path aggregation 900 of FIG. 8. The path above happens only when [ebp+0x8]−[ebp+0xc]≤0. Once this happens, we can tell that the outcome is eax=[ebp+0xc], which is the max value because [ebp+0x8]−[ebp+0xc]≤0 or [ebp+0x8]≤[ebp+0xc]. From the set of expressions representing the executed path, the execution of path instructions can be replaced by a series of simple computations.

Multi-Path Aggregation

Statically, one cannot decide which path the execution should take. Only when input data is entered during dynamic run time, will a certain path be executed. TMF however, is able to provide the multi-path aggregation which covers all possible paths from any block. Each path is associated with certain conditions. These conditions, when computed with real input data, will dictate what path the execution would take. That capability is powerful in terms of providing a big picture to an analyst who wants to know the possible choices given different inputs. To illustrate the multi-path aggregation, the same min/max examples as in previous subsections are used.

Figure 10:
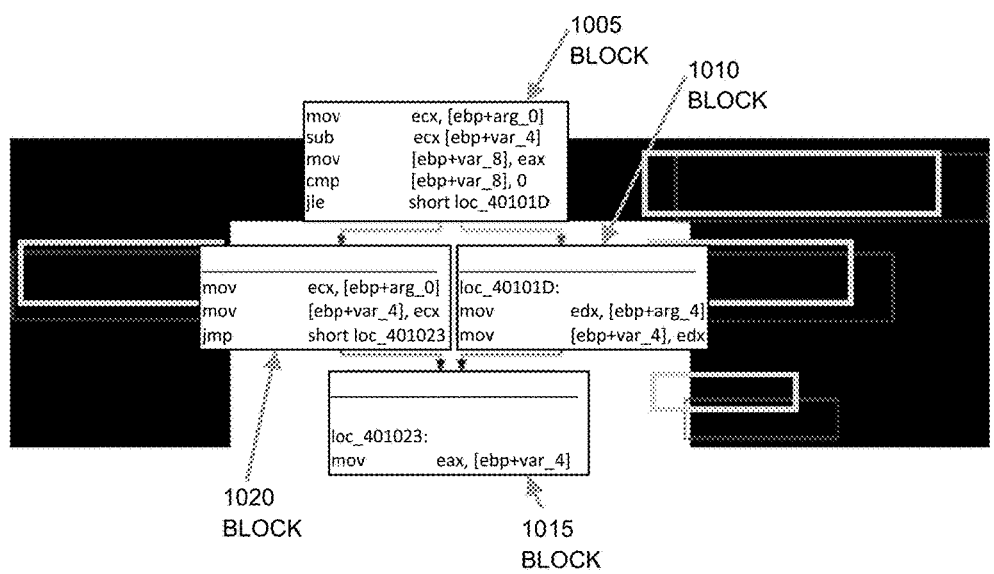
FIG. 10 depicts multi-path modelling configured in accordance with an embodiment.

FIG. 10 depicts Multi-Path Modelling 1000. There are two possible paths based on the outcome of subtraction. If [ebp−0x8] is positive, block 1020 is executed, otherwise block 1010 would be. Blocks 1005 and 1015 are blocks that will be executed no matter what the outcome.

Figure 11:
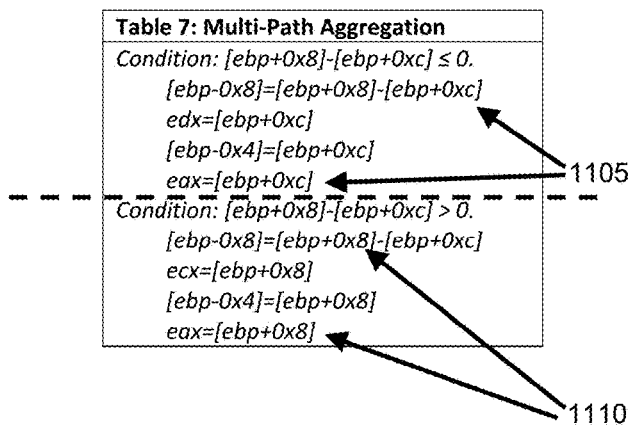
FIG. 11 is a Table 7: multi-path aggregation configured in accordance with an embodiment.

FIG. 11, Table 7, 1100 provides a clear cut solution of the max example. If the difference is negative, the max value eax is second number 1105. If the difference is positive, the max is first number 1110. TMF thus proves its capability to abstract the assembly instructions into a set of meaningful algebraic expressions.

Function Aggregation

Function aggregation is a collection of mutually exclusive aggregated paths. The path to be executed depends on the values of passed-in arguments. The max example in the previous section could be wrapped in a function which has two arguments as two numbers [ebp+0x8] and [ebp+0xc] and returned value as eax. As with multi-path aggregation, the function aggregation provides a clear cut decision tree of what inputs would lead to what paths and what results. FIG. 11, Table 7 indicates that if [ebp+0x8]−[ebp+0xc]≤0 or num1−num2≤0, then the max would be eax=[ebp+0xc], i.e., second number is the max.

Figure 12:
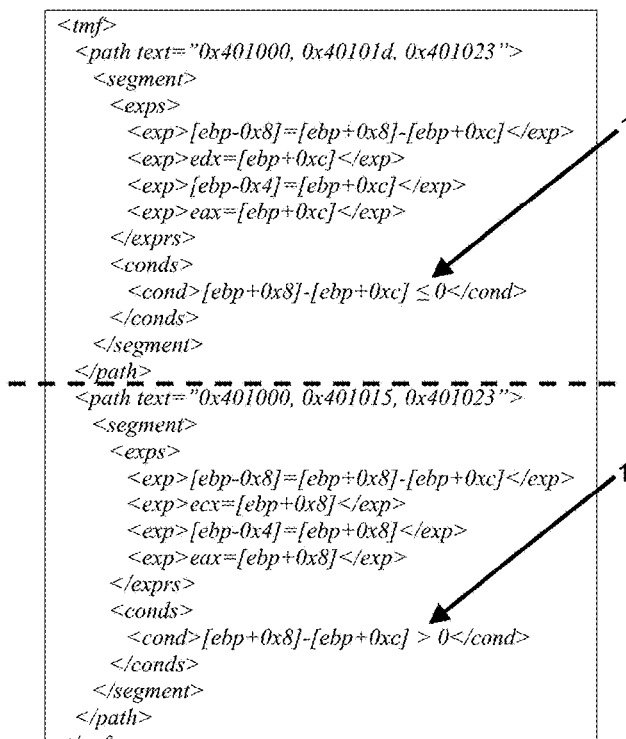
FIG. 12 is a Table 8: XML version of aggregation of max function configured in accordance with an embodiment.

FIG. 12, Table 8 shows an XML version of max function aggregation 1200. A TMF XML can have multiple paths. In this example, one path 1205 has [ebp+0x8]>[ebp+0xc] or num1>num2 and other path 1210 has [ebp+0x8]≤[ebp+0xc] or num1≤num2. A path can contain several segments which would be discussed in next sub-section. Each segment has a list of algebraic expressions and a list of conditions which are path conditions.

Called Functions

A function can be called (callee) by other functions (caller). The callees break a caller segment into several sub-segments, where each sub-segment is ended by a call instruction. The callee is expressed in XML as a condition, and callees' arguments are in expressions. For instance, 'max' function with two arguments [ebp+0x8] (num1) and [ebp+0xc] (num2) can be called in XML as follows:

```
<exprs>
    <expr>[esp−0x4]=0x8044400</expr>
    <expr>[esp]=[ebp+0x8]</expr>
    <expr>[esp+0x4]=[ebp+0xc]</expr>
</exprs>
<conds>
    <call>max</call>
</conds>
```

Three entities are pushed onto the stack in order before max is called: returned address 0x8044400 at [esp−0x4], first argument [ebp+0x8] at [esp] and second argument [ebp+0xc] at [esp+0x4]. All are expressed in node <exprs>.

Loop Aggregation

Loop is complex data structure with a history of research. TMF is able to handle most natural loops using dominance algorithm. Natural loop is defined as loop whose back edge forms smallest set of nodes including back edge and has no predecessors outside the set except for the predecessor of the header. TMF divides loops into two categories: non-nested loops and nested loops.

Non-Nested Loops

With a non-nested loop, TMF can compute loop variables, loop invariants and loop exit conditions. With exit conditions, TMF constructs inequalities to solve algebraically for the number of iterations to satisfy the conditions. TMF thus does not need to unroll the loop. This feature avoids the most time consuming computation process.

Figure 13:
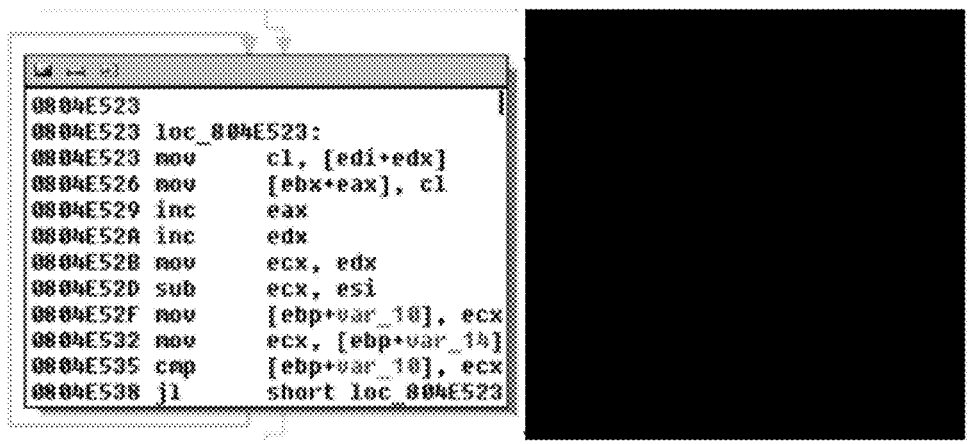
FIG. 13 depicts a loop and its Taint Modeling Functions (TMFs) configured in accordance with an embodiment.

FIG. 13 depicts a loop and its TMF 1300 illustrating this feature. From algebraic expressions, we can understand the meaning of the loop. The first expression [ebx+eax]=[edi+edx] where eax and edx are set to 0 before the loop, and incremented inside the loop. This expression means the source buffer [edi+edx], whose index is edx, is copied to destination buffer [ebx+eax] whose index is eax. The loop continues as long as the inequality edx+1−esi−[ebp−0x14]<0 is satisfied where [ebp−0x14] is a local variable and assigned with some constant value before the loop.

To find out number of iterations it takes to exit the loop, we introduce loop variable n generalized from incremented indices in loop: eax=eax+1 and edx=edx+1. The increment with loop variable n now becomes: eax=eax+n and edx=edx+n. The buffer copying process then becomes [ebx+eax+n]=[edi+edx+n], and the exit condition becomes edx+n−esi−[ebp−0x14]<0. This inequality is satisfied as long as n<[ebp−0x14]+esi−edx. With real values plugged into inequality, we can solve for n. Note that all terms in exit conditions have an original value before loop. For example, let [ebp−0x14]=15, esi=3 and edx=0, then n<15−3+0=12, i.e., it would iterate 12 times to exit the loop above. In other words, instead of unrolling the loop dynamically, we can statically compute all aspects of the loops including how many times the loops would unroll mathematically.

Nested Loops

Nested loops are loops inside other loops. The dynamic aspects of inner loops and outer loops plus the interactions between them make the static computation mentioned in non-nested loop section above in general impossible. Another generic method is needed to handle nested loops and non-nested loops also.

TMF treats all loops in nested loops as separate functions where all activities in loops occur inside loop-equivalent functions and the caller just gathers the final outcomes from the loops when they are finished. In other words, the most-outer-loop calls inner-loop-equivalent functions and the functions, in turn, call the most-inner-loop-equivalent function. The XML version of TMF of loop-equivalent function is almost as same as that of a function plus indicator of loop.

FIG. 14, Table 9, describes an XML version of a loop 1400. Loop always has two segments: one is before and one is after exit conditions. The segment after exit conditions can be empty in case of exit conditions are at the end of loop. The computation of loop starts from the first segment. At the end of first segment, exit conditions are checked. If they are satisfied, computation of loop is done, otherwise continuing to compute the segment after exit conditions. The next round of computation would repeat the same process until the exit conditions are satisfied.

Recursion

"Recursion is the process of repeating items in a self-similar way". TMF treats recursion as a function calling another function, even though the callee and caller are the same. The recursion is finished when all base cases are satisfied.

Recursive TMF must have at least two paths: one path has a call to itself and the other path has no call to itself. The latter is the base case.

FIG. 15, Table 10, describes the skeleton of recursion function 1500. The second <path> section describes a path that leads the function to call itself as expressed by <call>itself</call>.

Applications

TMF abstracts application binary to a set of algebraic expressions. The lossless abstraction lifts software understanding to a higher level where human and software can take advantage of meaningful patterns from concrete algebraic representation of the binary code to create better tools in interpreting the binary code without source code.

Among the tools are constraint generation, data flow analysis, exploratory bug searches, range and domain analysis, path pruning and return-oriented programming.

Constraint Analysis Optimization

Constraint based techniques have been used to model program analyses. One of the known constraint problems is finding inputs that direct execution path to certain predetermined paths. To generate constraints for that problem, data flow analysis or taint is used. Taint however is a time consuming and CPU intensive process which requires tracing all executed instructions in a manner that all operations are recorded in detail. The traces are then processed to track the data flow coming from inputs or points of interest along the executed path. A simple over/under taint could cause very large deviation from the correct set of taints, thus renders set of generated constraints under/over-optimized, i.e., more/less constraints than necessary.

TMF sets of input-output relationships are used to optimize the set of generated constraints by removing irrelevant ones. The irrelevant constraints are ones that have no influence to the desired path. TMF analysis of static data flow could replace taints in most places, and in some case where taints are necessary such as indirect addresses, it could help reduce amount of computation using algebraic expressions. The taintless approach speeds up the process of constraint generation by avoiding taints as much as possible and removing irrelevant constraints.

The algorithm of constraint optimization using TMF is as follows. Assume a desired path is selected which is different from executed path. The constraint generation starts from the last identical block of the desired and executed paths. The jump condition at that last block would be the first constraint problem to solve. There are two types of jumps: conditional jumps such as 'jump if less than' or unconditional jumps such as calling other function. The jump in question must be a conditional jump; otherwise no constraint is generated, because the path cannot be changed.

The analysis is made possible by TMF aggregated expressions. As in multi-path aggregation, discussed in the Multi-Path Aggregation Section, the conditions are analyzed beforehand. Each of the components that constitutes the conditions would be aggregated, and their aggregated values form the optimal constraints for that block. The constraint generation process goes upwards until the needed inputs are found.

FIG. 16 presents a partial desired path 1600. Circled block 1605 has two potential next blocks. One is block 1610, and the other is block 1615. Block 1610 is where the desired path will go. Block 1615 is where the executed path ends. We look at the block above them which is circled block 1605. This block is magnified in FIG. 16 with broken-lined block 1620. The condition to go to block 1610 is $[ebp-0xc] \leq 5$. Next, we go to the block above the conditioned block 1610 which is block 1605 0xe61080—another magnified broken-lined-block 1625. The condition of this block is $[ebp-0xc] \geq 4$. Combining these two conditions together, we have $5 \geq [ebp-0xc] \geq 4$. Next task would be aggregation of the components of conditions. According to TMF of that block, $[ebp-0xc]=[ebp-0x10] \pm [ebp-0x8]+[ebp-0x4]$. These are three local variables of that function. Aggregating these local variables to the beginning of the function yields three registers eax, ecx, and edx as inputs. They are three registers that obtain three user inputs from the scanf function. Therefore, to be able to go block 1610 right below circled block 1605, the sum of the three inputs must be 4 or 5. Outside that range, the path will go to the sibling block 1615.

Data Flow Analysis

As the name Taint Modeling Function implies, TMF expresses complex taint or data flow in application as algebraic expressions.

Figure 17:
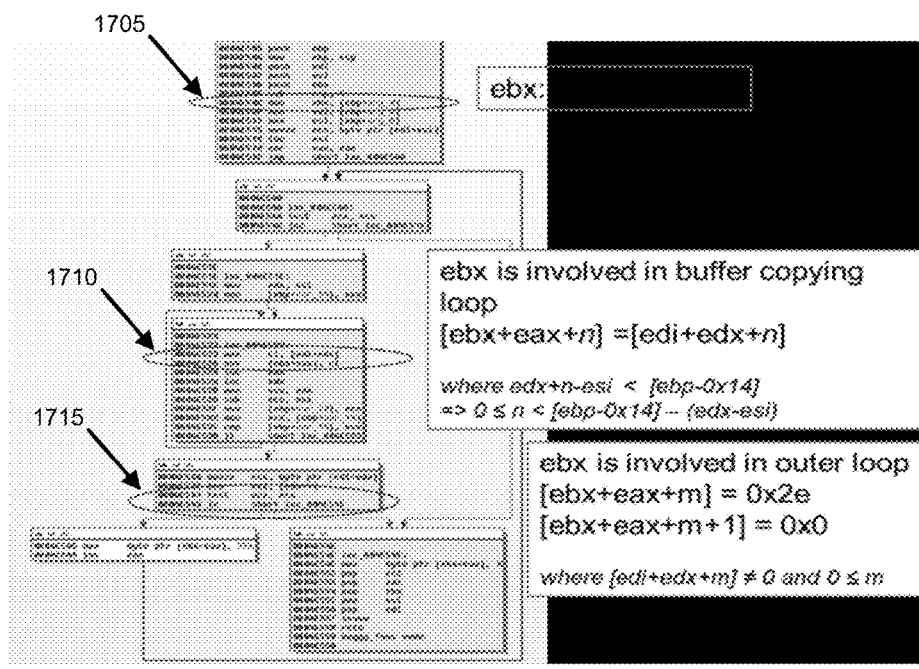
FIG. 17 depicts a data flow analysis of configured in accordance with an embodiment.

FIG. 17 presents the control flow graphic 1700 of a function.

In this graphic, ebx is the first argument of the function, as circled by the first oval 1705. This register involves thoroughly inside the function. As a result, TMF representation also exposes the involvement of this register ebx in mathematical expressions as well.

The function contains nested loops. The most inner loop is the one discussed in the Non-Nested Loop Section. This loop has only one node. Its task is to copy data from one buffer to another. Second oval 1710 reveals the buffer copying in a loop which is modeled as $[ebx+eax+n]=[edi+edx+n]$. Register ebx is the pointer of the destination buffer, as seen as a component of $[ebx+eax+n]$. Register eax is the index of the buffer which is modeled as eax+n. The source buffer is represented by its pointer edi and index edx. The buffer copying is ended when exit condition $edx+n-esi< [ebp-0x14]$ is satisfied. See the Non-Nested Loop Section for more detail.

The outer loop also contains a buffer copying process. The buffer pointer is again represented by register ebx as $[ebx+eax+m]=0x2e$ and $[ebx+eax+m+1]=0x0$. The buffer obtains constant numbers as 0x2e and 0x0 this time. The outer loop is ended when exit conditions $[edi+edx+m] \neq 0$ and $m \geq 0$. Third oval 1715 contains the native machine code that implements the check for the exit conditions. If the exit conditions are not met, the loop continues.

TMF can not only expose the relationships between registers and memory locations in the scope that it explores, it also presents the framework that allows one to enter input data to see how a section of codes behaves. This framework is applicable for automatic approaches where the analysis happens just once and can be reused later. The "analyze once and execute many times" capability lifts the limitation of taint analysis in time and space, and thus could explore broader and deeper into application space.

Exploratory Bug Searches

As mentioned, software development is a complex process. Software errors or 'bugs' are unavoidable in developing applications. Needless to say, testing procedure becomes increasingly important to detect the existing and potential bugs. Detecting bugs with source code is hard. Detecting bugs in application without source code is even harder due to the complexity and cryptic characteristics of assembly instructions.

Abstraction of binary codes can be used to simplify the process of understanding binary code and detecting bugs. TMF contributes to that effort by using its algebraic patterns to search for bugs statically in entire application space and therefore achieve very high code coverage. Developers who use TMF to search for bugs just need to write heuristic rules.

For instance, a buffer overflow bug happens when the buffer is smaller than its received data size. When that data is copied to the buffer, it accidentally overwrites part of the stack which can change the execution direction and cause undesired effects. The heuristic rules to detect buffer overflow are:

Find loops in entire application space.
In the found loops, focus only on loops that have data copying to a buffer.
In these filtered loops, find exit conditions that could become bad, i.e., controlled by user inputs.

If exit conditions can be controlled by user inputs, then carefully crafted inputs could cause loops to never exit or at least exit after a very large number of iterations which likely overflows the buffers inside the loops.

Figure 18:
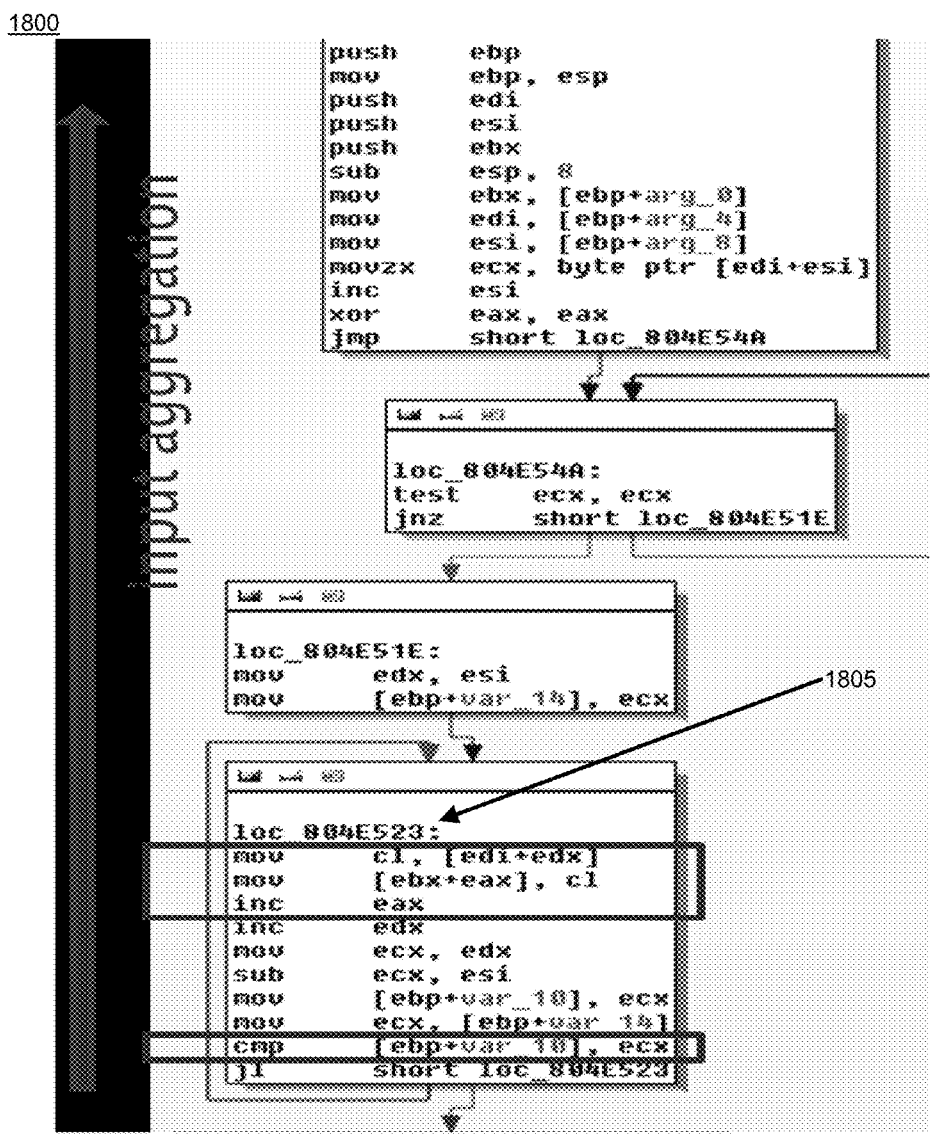
FIG. 18 depicts a buffer overflow bug search configured in accordance with an embodiment.

FIG. 18 presents a section of binary code 1800 that contains a buffer overflow bug. Following the heuristic strategy mentioned above, a loop is found at address 0x804e523 1805. The next step is to find the buffer copying in this loop. The TMF expressions for this block are displayed in FIG. 13. The expression [ebx+eax]=[edi+edx] has eax and edx as indices of the buffers, and they are incremented inside the loop. The expression is a telltale of data transfer whose source is the buffer pointed to by ebx and the destination is the buffer pointed to by edi. Two of the three rules are satisfied; we need to confirm if the third rule conforms, which is: if the exit condition is controllable by user input. The exit condition is represented by the expression edx+n−esi−[ebp−0x14]<0. To check if the condition is bad, one must find if this inequality can be controlled by user inputs or function arguments. There are three terms in the expression which are: edx, esi and [ebp−0x14]. Function aggregation reveals the origins of these terms: [esp+0xc] for esi, and [[esp+0x8]+[esp+0xc]] for [ebp−0x14]. These are function arguments which are capable of being changed from the caller, therefore the exit condition could be poisoned on purpose. The loop then has a potential buffer overflow bug.

If the user can control either [esp+0xc] or [esp+0x8] or both, then the overflow of the buffer [ebx+eax] is unavoidable. Detecting whether these terms can be controlled by users can be done by a dynamic taint approach.

Range and Domain Analysis

One of the tools that detects bugs is range and domain analysis. The tool finds the possible ranges and domains that the function in question covers. It allows the developer to find the inputs that expose the corner cases which are usually missed in normal operation. For instance, the thermostat has some ranges which normal operations rarely reach, and therefore would not exercise the codes that handle such cases.

TMF aggregation yields a set of conditions for multi-path aggregation as seen in the Multi-Path Aggregation Section. TMF also summarizes the computations that happen during execution of the path. Combining these two features, TMF can provide a thorough range and domain analysis.

Figure 19:
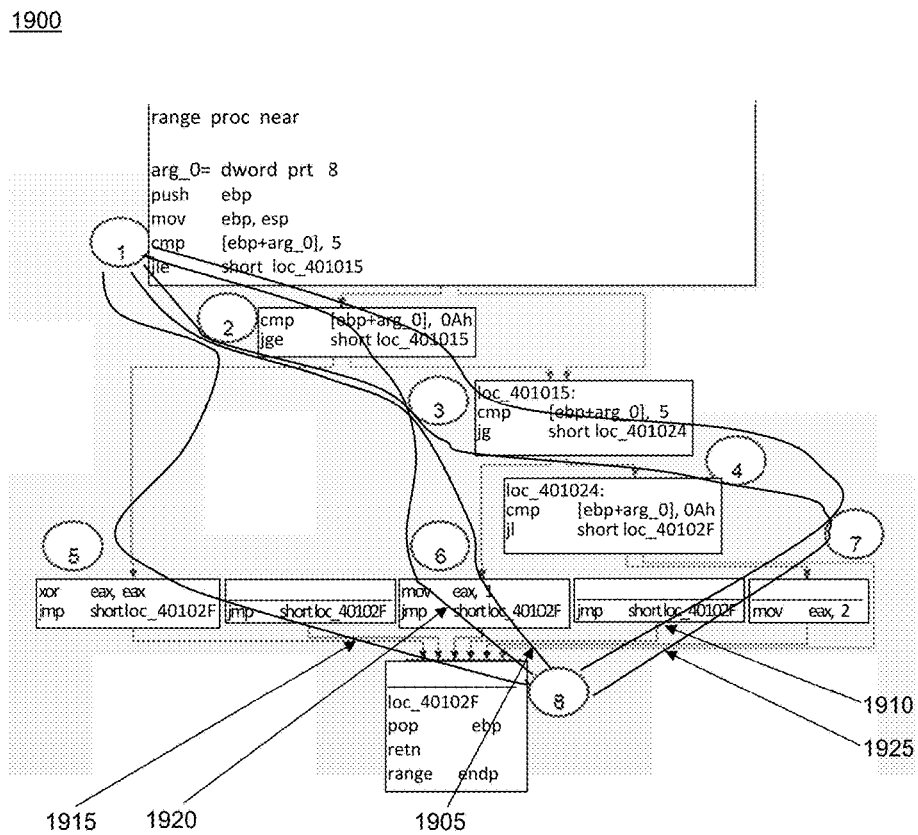
FIG. 19 depicts a range and domain analysis of a function configured in accordance with an embodiment.

FIG. 19 presents a function to be examined by TMF 1900. Multi-path analysis provides a set of paths. Each of them will be analyzed as part of example. The path 1, 2, 3, 6, 8 1905 has a set of conflict conditions: [ebp+0x8]>5, [ebp+0x8]≥10 and [ebp+0x8]≤5. This path 1905 therefore is pruned, i.e., the path will be never exercised. The other path 1, 3, 4, 7, 8 1910 is also pruned because of conflict conditions: [ebp+0x8]≤5, [ebp+0x8]>5 and [ebp+0x8]≥10. The other three paths are valid:

1, 2, 5, 8 1915 with conditions: [ebp+0x8]>5 and [ebp+0x8]<10. The output of the function: eax=0.
1, 3, 6, 8 1920 with condition: [ebp+0x8]≤5 and output eax=1.
1, 2, 3, 4, 7, 8 1925 with conditions: [ebp+0x8]>5 and [ebp+0x8]≥10 and output eax=2.

Combining these conditions and outputs, TMF can come up with domain: [−∞, ∞] and range: {0, 1, 2}.

Path Pruning

As seen in previous section, domain and range analysis can prune some paths that are never exercised in operation. Such pruning saves time in tasks that involve execution paths. The pruning in the Range and Domain Analysis Section is local to functional scope.

Figure 20:
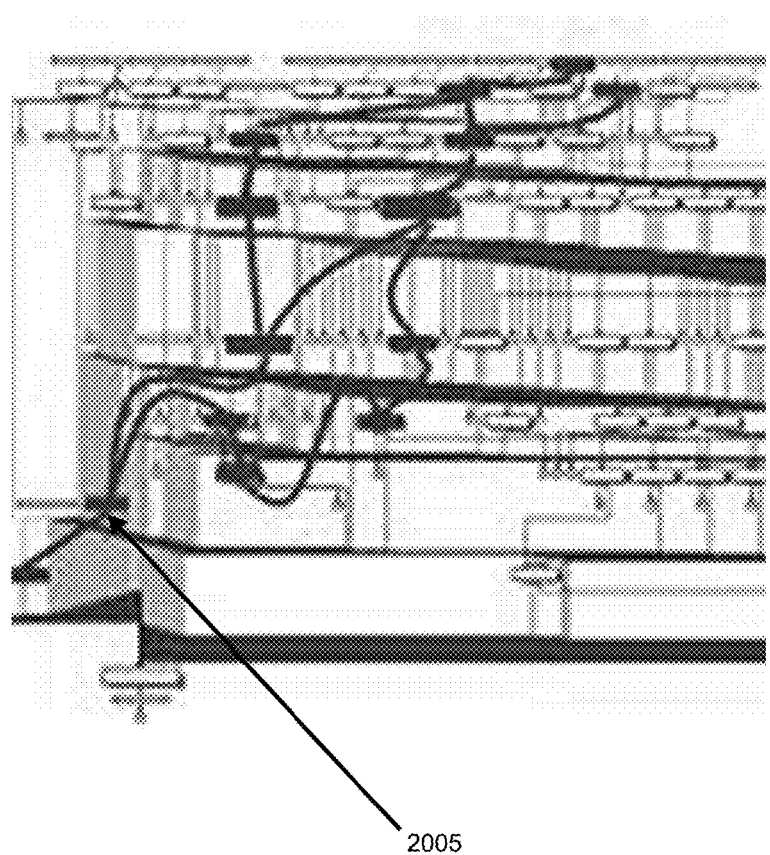
FIG. 20 is an illustration of task-oriented path pruning configured in accordance with an embodiment.

FIG. 20 shows another path pruning technique, task-oriented pruning 2000, spans the whole application space.

This type of pruning relies on certain 'hot spots' such as potential bugs and finds only paths that lead to those places. FIG. 20 shows the red paths 2005 that lead to the destination. The rest of application space is ignored for that task. TMF aggregation statically analyzes binary code and uses heuristic rules to find potential vulnerabilities. Once the 'hot spots' are found, static path analysis which uses TMF information to find possible paths to the nodes which narrows down scope of dynamic searches.

Return Oriented Programming

The exploitation such as buffer overflow finds a way to modify the returned address, and therefore could change execution direction to the attacker's benefit. Before data execution prevention (DEP) (executable space protection on Windows) was implemented, certain shellcode which piggybacks on data that overflows the buffer could be deposited onto the stack and executed from there. That simple exploit is no longer available thanks to DEP. A new technique named return-oriented programming (ROP) can bypass DEP by executing chunks of code that are already marked as executable in memory such as code in the application itself and shared linked libraries.

ROP finds certain instructions in the block that satisfy some constraints, and is ended by return or call instruction. The constraints can be expressed as expressions to be queried using TMF.

FIG. 21 depicts VirtualAllocEx Called in an Application 2100. This is an example of such constraints that are the parameters of a well-known API that allocates chunks of memory within virtual address space in a process: VirtualAllocEx. This API was found in target application at 0x7c809ae6 2105. The API has five parameters: hProcess, lpAddress, dwSize, flAllocationType and flProtect, and we are interested in dwSize and flAllocationType or [ebp+0xc] and [ebp+0x10] accordingly as in FIG. 21. dwSize and flAllocationType determine the size and type of the allocated memory. Memory allocations that are too small or of the wrong type are often the direct cause of bugs and vulnerabilities.

CONCLUSION

As explained, the Taint Modeling Function (TMF) is a novel approach to abstract binary code for software analysis. TMF transforms the binary executables to sets of precise algebraic expressions thanks to intermediate language PREIL. PREIL is an intermediate language that simplifies and disambiguates native language. The lossless abstraction of binary codes via algebraic expressions makes it possible to automate static analysis tasks such as detecting defective code patterns, generate constraints to find needed inputs for desired paths, and narrowing search space for potential bugs. The expressions are also simple for human analysts who want to understand the target software inside out via querying TMF expressions in database. The automated applications of TMF can help balance the currently imbalanced of generating versus detecting malevolent software by speeding up the process of bug finding, and alleviating human users from that tedious and difficult task.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A method performed by at least one computer processing unit for reverse engineering analysis of binary applications the method comprising the steps of:
   inspecting binary files from a target application;
   translating native instructions of said target application into an intermediate language Power Reverse Engineering Intermediate Language (PREIL);
   transforming and aggregating said PREIL instructions by a Taint Modeling Function (TMF);
   pre-calculating, comprising a Taint Engine (TE), relevant data pedigrees, allowing efficient queries on Taint, plus both forward and backward Taint tracing;
   processing output of said TMF in a main loop comprising PRIEL emulation, Taint analysis, and a dynamic behavior sensor; and
   producing output reports identifying undesirable coding patterns in an entire application space.

2. The method of claim 1, comprising preprocessing said translated native instructions into platform-independent PREIL instructions.

3. The method of claim 2, wherein said pre-processing is computed once.

4. The method of claim 1, wherein said TMF forms higher-level semantic expressions from PREIL lists.

5. The method of claim 1 wherein said TMF transforming and aggregating comprises modeling each PREIL instruction as an algebraic expression and then aggregating said algebraic expression to form TMF expressions.

6. The method of claim 5 wherein said aggregation occurs at multiple levels, comprising instruction, basic block, single path, multiple path, loop, and function levels, capturing relationships between inputs and outputs.

7. The method of claim 1 wherein said TMF retains all relevant semantic information such as constraints that have an influence on a desired path, and wherein abstraction is lossless.

8. The method of claim 1, wherein preprocessing optionally incorporates additional data from dynamically obtained traces at a point of said traces.

9. The method of claim 1 further comprising a taint engine (TE), wherein said taint engine traces all values and code branches from a designated program input, storing input ancestry at each instruction or branch.

10. The method of claim 1 wherein said analysis is static and optionally uses dynamically obtained traces to fill in gaps in executable control flow understanding.

11. The method of claim 1, wherein said aggregation finds directed relations between inputs and outputs from a list of TMF expressions.

12. The method of claim 1, wherein said TMF comprises transforming PREIL instructions and relevant data structures into algebraic expressions and using them in applications comprising constraint generation, mathematical representation, data flow analysis, exploratory bug searches, range and domain analysis, path pruning, and return-oriented programming.

13. The method of claim 1 wherein pre-processing automatically compares resulting PREIL with executing binary, and makes corrections to provide an accurate static representation.

14. The method of claim 1, wherein introspection comprises obtaining only an initial state of application memory and registers.

15. A system for reverse engineering analysis of binary applications to find hidden malicious code comprising:
   a processor; memory coupled to said processor, wherein said memory includes an analysis module to:
   inspect binary files from a target application;
   translate native instructions into an intermediate language Power Reverse Engineering Intermediate Language (PREIL);
   transform and aggregate said PREIL instructions by a Taint Modeling Function (TMF);
   pre-calculate, comprising a Taint Engine (TE), relevant data pedigrees, allowing efficient queries on Taint, plus both forward and backward Taint tracing;
   process output of said TMF in a main loop comprising PRIEL emulation, Taint analysis, and a dynamic behavior sensor; and
   produce output reports identifying undesirable coding patterns in the entire application space.

16. The system of claim 15, wherein said TMF is an architecture-independent machine-readable format that captures application control flow, and substantially eliminates semantically irrelevant instructions for efficient automated analysis.

17. The system of claim 15 wherein Constraint Optimization, Management, Extensions, and Translation System (COMETS) and TMF solve mathematically for feasible code execution paths, identifying all feasible paths from input data to any point of interest in said binary applications.

18. The system of claim 15, wherein Constraint Optimization, Management, Extensions, and Translation System (COMETS) solves for a set of input values that cause any particular code branch to be taken, resulting in specific input values that result in execution of all branches needed to reach a point of interest, or else COMETS reports that no input can reach said point of interest.

19. A non-transitory computer-readable storage medium including instructions that are configured, when executed by a computing system, to perform a method for reverse engineering analysis of binary applications by reading low-level languages to capture semantics from code for analysis to find hidden malicious code, the method comprising:
  inspecting binary files from a target application;
  translating native instructions into an intermediate language Power Reverse Engineering Intermediate Language (PREIL);
  transforming and aggregating said PREIL instructions by a Taint Modeling Function (TMF);
  pre-calculating, comprising a Taint Engine (TE), relevant data pedigrees, allowing efficient queries on Taint, plus both forward and backward Taint tracing;
  processing output of said TMF in a main loop comprising PRIEL emulation, Taint analysis, and a dynamic behavior sensor; and
  producing output reports identifying undesirable coding patterns in the entire application space.

* * * * *